(12) United States Patent
Garhart

(10) Patent No.: US 10,919,233 B2
(45) Date of Patent: Feb. 16, 2021

(54) SELF-CLAMPING SELF-CURING BOND METHOD

(71) Applicant: Sikorsky Aircraft Corporation, Stratford, CT (US)

(72) Inventor: Jonathan K. Garhart, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1079 days.

(21) Appl. No.: 15/400,415

(22) Filed: Jan. 6, 2017

(65) Prior Publication Data

US 2017/0198735 A1      Jul. 13, 2017

Related U.S. Application Data

(60) Provisional application No. 62/276,351, filed on Jan. 8, 2016.

(51) Int. Cl.
*B29C 65/48* (2006.01)
*B29C 65/34* (2006.01)
*C09J 5/06* (2006.01)
*F16B 11/00* (2006.01)

(52) U.S. Cl.
CPC .............. *B29C 65/34* (2013.01); *B29C 65/48* (2013.01); *C09J 5/06* (2013.01); *F16B 11/006* (2013.01)

(58) Field of Classification Search
CPC ................................. B29C 65/34; C09J 5/06
USPC ..................................................... 156/273.9
See application file for complete search history.

(56) References Cited

U.S. PATENT DOCUMENTS

| 4,560,428 | A | * | 12/1985 | Sherrick | ............. B29C 65/5021 |
| | | | | | 156/94 |
| 5,389,184 | A | * | 2/1995 | Jacaruso | ............... B29C 65/342 |
| | | | | | 156/378 |
| 5,829,716 | A | * | 11/1998 | Kirkwood | ............... B64C 1/065 |
| | | | | | 244/117 R |
| 2004/0055699 | A1 | * | 3/2004 | Smith | ................. B29C 65/3468 |
| | | | | | 156/273.9 |
| 2013/0340252 | A1 | | 12/2013 | Garcia Castro et al. | |
| 2014/0011414 | A1 | | 1/2014 | Kruckenberg et al. | |

FOREIGN PATENT DOCUMENTS

| WO | 2010037680 A1 | 4/2010 |
| WO | 2014114915 A1 | 7/2014 |
| WO | 2014147243 A1 | 9/2014 |
| WO | 2015011549 A1 | 1/2015 |

* cited by examiner

*Primary Examiner* — Philip C Tucker
*Assistant Examiner* — John Blades
(74) *Attorney, Agent, or Firm* — Michael Best & Friedrich LLP

(57) ABSTRACT

A joint and a method of bonding a first member to a second member are disclosed. The joint includes a multi-layer adhesive material between the first member and the second member. The multi-layer adhesive material includes at least one adhesive material that is applied to one of the first member and the second member. The multi-layer adhesive material also includes a heating element for heating the at least one adhesive material and at least one permeable layer for allowing air to escape from between the first member and second member during heating of the at least one adhesive material.

20 Claims, 1 Drawing Sheet

SELF-CLAMPING SELF-CURING BOND METHOD

CROSS REFERENCE TO RELATED APPLICATIONS

The present invention claims priority to U.S. Provisional Application Ser. No. 62/276,351, filed Jan. 8, 2016, the contents of which are incorporated herein by reference in their entirety.

BACKGROUND OF THE INVENTION

The present invention is directed to bonding methods and, in particular, to a bonding method that is self-clamping and self-curing.

Current bonding processes involve applying an adhesive as a film or paste between the surfaces of two components, clamping the components together and allowing the adhesive to cure for an extended amount of time at room or elevated temperature. These processes are time-consuming, technically challenging on large structures and are often imprecise, resulting in non-uniform adhesive application and problematic clamping arrangements. Additionally, when bonds are to be disassembled, the bonded components need to be uniformly heated by an external source in order to soften the adhesive. If thermal curing adhesives are used, an entire structure must be heated to a cure temperature of the adhesive.

Accordingly, a bonding process is desired that can be performed without external clamping and without external heat sources.

SUMMARY OF THE INVENTION

According to one embodiment of the present invention, a method of bonding a first member to a second member is provided, the method including: placing a multi-layer adhesive material between the first member and the second member, wherein the multi-layer adhesive material includes a resistive heating element, at least one layer of adhesive material and at least one permeable layer; engaging the first member to the second member using the multi-layer adhesive material to form a joint; generating heat in the multi-layer adhesive material using the resistive heating element to bond the at least one adhesive material to one of the first member and the second member; and removing air from between the first member and second member via the at least one permeable layer.

According to another embodiment of the present invention, a joint bonding a first member to a second member includes a multi-layer adhesive material including: at least one adhesive material, wherein the at least one adhesive material is bonded to one of the first member and the second member; a heating element for heating the at least one adhesive material; and at least one permeable layer for allowing air to escape from between the first member and second member during heating of the at least one adhesive material.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
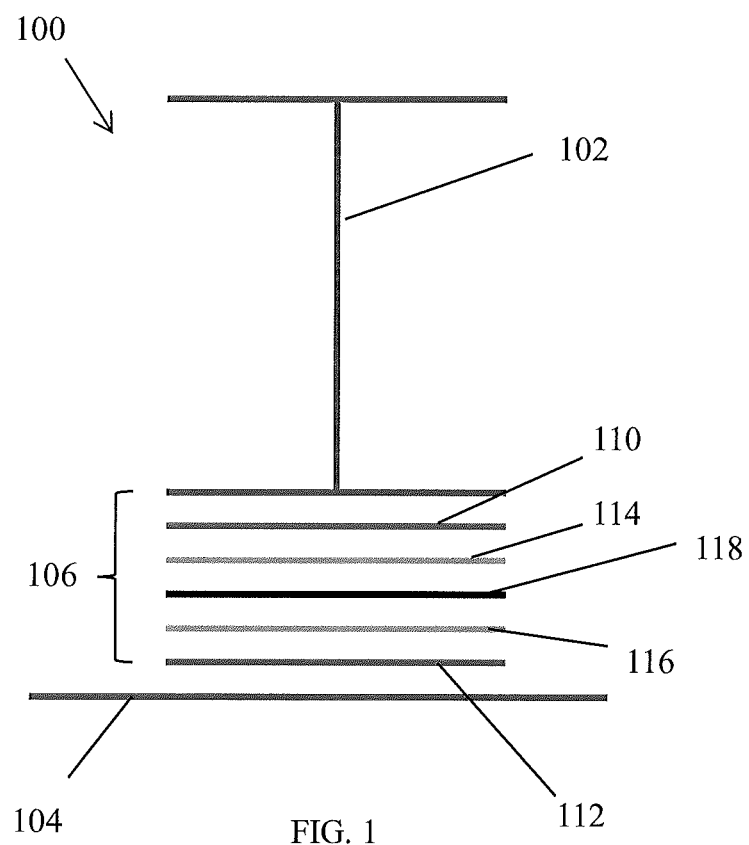
FIG. 1 shows an exploded view of a bonded structure according to one embodiment of the present invention.

Referring now to the Figures, where the invention will be described with reference to specific embodiments, without limiting same, FIG. 1 shows an exploded view of a bonded structure 100 according to one embodiment of the present invention. The structure 100 includes a first member 102 that is bonded to a second member 104 via a multi-layer adhesive material 106. The multi-layer adhesive material 106 includes a first adhesive layer 110, a second adhesive layer 112, a first permeable layer 114 (also referred to as a first carrier layer) and a second permeable layer 116, (also referred to as a second carrier layer) and a resistive heating element 118. The adhesive of the first adhesive layer 110 and second adhesive layer 112 is solid but tacky at room temperature. The first permeable layer 114 and second permeable layer 116 are generally made of a thermoplastic material and are porous to allow gas that is within the multi-layer adhesive material 106 to be evacuated from the multi-layer adhesive material 106 during bonding. The heating element 118 is generally a layer of carbon nanotube material. The heating element 118 is used to heat the first adhesive layer 110 and the second adhesive layer 112 from a location within the multi-layer adhesive material 106.

In the multi-layer adhesive material 106, the heating element 118 is sandwiched between the first permeable layer 114 and the second permeable layer 116, with the first permeable layer 114 on a top surface of the heating element 118 and the second permeable layer on a bottom surface of the heating element 118. The first permeable layer 114, second permeable layer 116 and heating element 118 are sandwiched by the first adhesive layer 110 and the second adhesive layer 112 such that the first adhesive layer 110 is coupled to a top surface of the first carrier layer 114 and the second adhesive layer 112 is coupled to a bottom surface of the second permeable layer 116. In various embodiments, the multi-layer adhesive material 106 can be provided as a pre-packaged or pre-assembled adhesive assembly. This pre-assembled adhesive assembly can be cut to a desired shape (such as a shape between bonding surfaces) and applied to a bonding surface of one of the first member 102 and the second member 104 and smoothed in place in order to eliminate bubbles, etc. In one embodiment, the pre-assembled adhesive assembly can be applied to the smaller of the two bonding surfaces in order to eliminate assembly challenges of correctly placing an adhesive material at a proper location on a large surface without a defined boundary marked.

Figure 2:
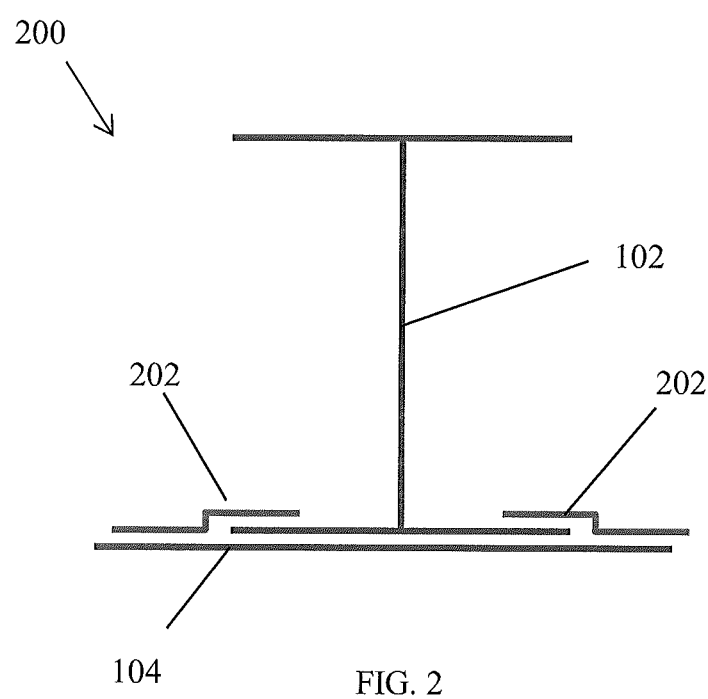
FIG. 2 shows a joint formed from the first member and the second member of the bonded structure using the methods disclosed herein.

FIG. 2 shows a joint 200 formed from the first member 102 second member 104 using the methods disclosed herein. To form the joint 200, the multi-layer adhesive material 106 is introduced between bonding surfaces of the first member 102 and second member 104 such that the first adhesive layer 110 is applied to a bonding surface of the first member 102 and the second adhesive layer 112 is applied to a bonding surface of the second member 104. In one embodiment, a first step includes bonding the multi-layer adhesive material 106 to the bonding surface of the first member 102 via the first adhesive layer 110, and a second step includes pressing the first member 102 and the second member 104 together so that the exposed second adhesive layer 112 is applied to the bonding surface of the second member 104. Alternatively, a first step includes bonding the multi-layer adhesive material 106 to the bonding surface of the second member 104 via the second adhesive layer 112 and a second step includes pressing the first member 102 and second member 104 together so that the exposed first adhesive layer 110 is applied to the bonding surface of the first member 102. The first member 102 and second member 104 are thus conjoined to form the joint 200. A perimeter of the joint 200 is sealed using for example a vacuum sealant 202 about the perimeter of the joint. The heating element 118 is then heated to a specified temperature in order to provide a suitable heat for curing the first adhesive layer 110 and the second adhesive layer 112. Current is applied to the resistive heating element 118 in order to generate heat necessary to melt and flow the first adhesive layer 110 into the first permeable layer 114 and the second adhesive layer 112 into the second permeable layer 116. Heating can thus be applied directly to first adhesive layer 110 and second adhesive layer 112 without having to provide heat via conduction through the first member 102 and/or the second member 104 from an external heat source.

During the heating process, a vacuum pump (not shown) can be used to produce a vacuum between the first member 102 and the second member 104, whereas any gases in the multi-layer adhesive material 106 are evacuated from the joint 200 via the first permeable layer 114 and the second permeable layer 116. Once the gases have been drawn out, the joint is secured by 1 atmosphere of external pressure. In order to disassemble the joint 200, the heating element 118 can be used to reheat and soften the first adhesive layer 110 and the second adhesive layer 112.

The bonding method disclosed herein provides uniform bonding over a surface area of the joint 200. The bonding method and joint 200 are self-clamping and therefore simplify the assembly process. The self-heating construction of the multi-layer adhesive material 106 eliminates the need to use external heaters or to put structures in an oven and avoids unnecessary heating of the surrounding structure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of bonding a first member to a second member, comprising:
    placing a multi-layer adhesive material between the first member and the second member, wherein the multi-layer adhesive material includes a resistive heating element, at least one layer of adhesive material, and at least one permeable layer;
    engaging the first member to the second member using the multi-layer adhesive material to form a joint;
    generating heat in the multi-layer adhesive material using the resistive heating element to bond the at least one adhesive material to one of the first member and the second member; and
    removing gas from between the first member and second member via the at least one permeable layer.

2. The method of claim 1, further comprising placing a vacuum sealant over the joint and removing the gas from the multi-layer adhesive material during heating of the multi-layer adhesive material.

3. The method of claim 2, further comprising removing the gas from the joint via the at least one permeable layer of the multi-layer adhesive material.

4. The method of claim 1, further comprising generating heat by applying a current through the heating element.

5. The method of claim 1, wherein the heating element includes a layer of carbon nanotube material.

6. The method of claim 1, wherein the at least one permeable layer further includes a first permeable layer and a second permeable layer and the at least one adhesive layer includes a first adhesive layer and a second adhesive layer, wherein the heating element is sandwiched between the first permeable layer and the second permeable layer, and the first permeable layer, second permeable layer and heating element are sandwiched between the first adhesive layer and the second adhesive layer.

7. The method of claim 1, wherein the multi-layer adhesive material includes a pre-packaged assembly.

8. The method of claim 1, wherein generating heat in the multi-layer adhesive material using the resistive heating element includes heating the at least one layer of adhesive material to flow into the at least one permeable layer.

9. The method of claim 8, further comprising placing a seal over the joint, and wherein removing the gas includes removing the gas from the sealed joint at least when the multi-layer adhesive material is heated to a specified temperature.

10. The method of claim 9, wherein the specified temperature provides a suitable heat for curing the at least one layer of adhesive material.

11. The method of claim 10, wherein removing the gas from the sealed joint includes removing the gas from the sealed joint during heating of the multi-layer adhesive.

12. The method of claim 9, wherein placing the seal over the joint includes placing a vacuum sealant over the joint.

13. The method of claim 9, wherein placing the seal over the joint includes placing the seal about a perimeter of the joint.

14. A method of bonding a first member to a second member, comprising:
    placing a multi-layer adhesive material between the first member and the second member, the multi-layer adhesive material including a resistive heating element, at least one layer of adhesive material, and at least one permeable layer;
    engaging the first member to the second member using the multi-layer adhesive material to form a joint;
    placing a seal over the joint;
    generating heat in the multi-layer adhesive material using the resistive heating element;
    removing gas from the sealed joint via the at least one permeable layer when the multi-layer adhesive material is heated to a specified temperature; and
    bonding the at least one adhesive material to one of the first member and the second member.

15. The method of claim 14, wherein the specified temperature provides a suitable heat for curing the at least one layer of adhesive material.

16. The method of claim 15, wherein removing the gas from the sealed joint includes removing the gas from the sealed joint during heating of the multi-layer adhesive.

17. The method of claim 14, wherein placing the seal over the joint includes placing a vacuum sealant over the joint.

18. The method of claim 14, wherein placing the seal over the joint includes placing the seal about a perimeter of the joint.

19. The method of claim 14, wherein generating heat in the multi-layer adhesive material using the resistive heating element includes heating the at least one layer of adhesive material to flow into the at least one permeable layer.

20. The method of claim 14, wherein the at least one permeable layer further includes a first permeable layer and a second permeable layer and the at least one adhesive layer includes a first adhesive layer and a second adhesive layer, wherein the heating element is sandwiched between the first permeable layer and the second permeable layer, and the first permeable layer, second permeable layer, and heating element are sandwiched between the first adhesive layer and the second adhesive layer.

* * * * *